US006858293B2

(12) United States Patent
Flosenzier et al.

(10) Patent No.: US 6,858,293 B2
(45) Date of Patent: Feb. 22, 2005

(54) CELLULOSE FILM WITH ANTI-BLOCKING PROPERTIES

(75) Inventors: Linda S. Flosenzier, Rochester, NY (US); Dennis E. Smith, Rochester, NY (US); Roland J. Koestner, Penfield, NY (US); William J. Gamble, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 121 days.

(21) Appl. No.: 10/104,450

(22) Filed: Mar. 22, 2002

(65) Prior Publication Data

US 2003/0180528 A1 Sep. 25, 2003

(51) Int. Cl.[7] .................... B32B 5/16; B32B 27/00; B32B 27/08; B32B 23/04
(52) U.S. Cl. .............. 428/327; 428/341; 428/500; 428/515; 428/534; 427/180; 427/372.2; 427/384; 427/541; 427/544
(58) Field of Search .............. 428/1.1, 1.6, 212, 428/219, 323, 327, 332, 340, 341, 411.1, 500, 515, 534; 427/532, 541, 544, 180, 331, 372.2, 384, 385.5

(56) References Cited

U.S. PATENT DOCUMENTS

| 5,238,736 A | * | 8/1993 | Tseng et al. ............ 428/327 |
| 5,393,589 A | * | 2/1995 | Zeller et al. ............ 428/192 |
| 5,480,715 A | * | 1/1996 | Mills et al. ............. 428/327 |
| 5,714,245 A | * | 2/1998 | Atherton et al. ......... 428/323 |

* cited by examiner

*Primary Examiner*—Sheeba Ahmed
(74) *Attorney, Agent, or Firm*—Arthur E. Kluegel

(57) ABSTRACT

Disclosed is an integral film comprising a transparent polymeric substrate having a surface bearing polymeric beads, wherein the swell ratio, the size, and the laydown of the beads are selected so as to provide both a one sided static friction coefficient of not more than 0.68 and an internal haze value of not more than 0.1. The film provides an improved combination of slip and optical properties.

28 Claims, No Drawings

CELLULOSE FILM WITH ANTI-BLOCKING PROPERTIES

FIELD OF THE INVENTION

This invention relates to polymeric films, which can be used as protective layers in optical components. More specifically it refers to polymer films having good surface slip properties and good optical properties.

BACKGROUND OF THE INVENTION

Smooth film surfaces tend to 'block' or stick together when stacked or rolled. This is particularly troublesome when rolled substrates are stored at high temperatures and humidity. Anti-blocking or slip agents have long been known to provide surface roughness to prevent adhesion between two sheets of what would otherwise be smooth film surfaces. The effect of roughening the surface is to reduce the frictional forces between the surfaces of sheets or layers of the substrate. Many inorganic and polymeric materials are known to act as good anti-blocking agents and various solutions to the problem have been proposed. Unfortunately, when particulates are added or surface roughness increased, generally, the film haze or light scattering properties of the films are also increased.

Another acceptable way to overcome blocking or high surface friction in rolled films is to utilize a variable knurling profile in the wound roll as described in U.S. Pat. No. 5,393,589. Knurling refers to the processes for producing a pattern of raised features on one or both sides of a web. In variable knurling, the height of the raised features is varied throughout the length of the roll in a predetermined profile to allow for high knurl heights near the core where pressure damage can occur and thinner knurl heights at the outer layers of the roll where distortion in the web can occur.

In coating anti-blocking agents on substrates used in optical devices, improved surface slip must be achieved without any deterioration of the optical properties. An example of this situation would be the use of anti-blocking layers on triacetyl cellulose (TAC) film as more fully described later. TAC film is typically used as polarizer protective layers in the manufacture of LCD's. The fundamental lack of TAC polymer orientation combined with the low stresses of solvent casting, forms a unique polymer system for extremely isotropic LCD coversheets. These fundamental advantages have allowed solvent cast cellulose triacetate to capture the vast majority of LCD coversheet applications. However, the TAC is a soft film and when produced and rolled, the smooth front and back film surfaces have a tendency to stick or block together and generate poor wound roll quality which leads to defects in the LCD protective layers.

The typical method, which has been used to provide modified surface friction and anti-blocking properties to TAC films out in the industry, has been to incorporate fine silica particles (10–20 nm) into the cast film. However, surface only application of the matting particle is preferred as this minimizes the amount of material to be incorporated. Also for good optical properties as well as anti-blocking properties polymeric beads are often advantageous. A bead type can be chosen for the functionality of the components, hardness (usually expressed as degree of crosslinking), size and narrow particle size distribution. For example, U.S. Pat. No. 5,238,736 discloses the combination of the hardness of polymethylmethacrylate with the lubricity of long-chain hydrocarbons in microspheres produced from homopolymers of diol di(meth)acrylates and/or copolymers with long-chain aliphatic alcohol esters of (meth)acrylic acid and/or ethylenically unsaturated comonomer. This type of bead is demonstrated to work well for smooth hard coated layers such as acrylic coatings on PET. The patent specifically teaches that there is a minimum in the chain length for the diol di(meth)acrylate in order for advantaged friction properties to be observed and there are no teachings to describe the impact of a coated matte layer on the optical property requirements of films.

In the case of coating on a soft substrate such as TAC the degree of crosslinking in the matte beads is surprisingly not a sufficient measure of hardness to be able to provide good surface friction properties which are important to predicting good wound roll quality. A better indicator of good surface friction performance is the degree to which the bead swells in a coating solvent.

SUMMARY OF THE INVENTION

The invention provides an integral film comprising a transparent polymeric substrate having a surface bearing polymeric beads, wherein the swell ratio, the size, and the laydown of the beads are selected so as to provide both a one sided static friction coefficient of not more than 0.68 and an internal haze value of not more than 0.1.

The invention also provides a process for making the integral film of the invention.

The film provides an improved combination of slip and optical properties.

DETAILED DESCRIPTION OF THE INVENTION

Definitions

The following terms are defined for purposes of describing the invention.

Degree of crosslinking means the weight percentage of polyfunctional ethylenically unsaturated polymerizable monomers used to make the polymer.

Internal haze means the percentage of transmitted light that is scattered due to particles in the film without contribution from surface scattering effects.

Isotropic polymer means a polymer that exhibits substantially the same refractive index (within 0.02) in all directions.

One sided static friction coefficient means the static friction coefficient measured in the usual manner according to ASTM designation G143-96 obtained by measuring the friction coefficient between a film comprising a polymeric substrate having a surface bearing polymeric beads in contact with the same substrate in its uncoated form.

Transparent means that the transmitted light is 93% or greater.

Swell Ratio means the median bead diameter (based on volume distribution) measured in methylene chloride divided by the median diameter of the beads as made.

Median diameter is defined as the statistical average of the measured particle size distribution on a volume basis. For further details concerning median diameter measurement, see T. Allen, "Particle Size Measurement", 4th Ed., Chapman and Hall, (1990).

Total haze means the percentage of transmitted light that is scattered due to a combination of surface irregularities and particles in the film.

Two sided static friction coefficient means the static friction coefficient measured in the usual manner according to ASTM designation G143-96 obtained by measuring the friction coefficient between two films comprising a polymeric substrate having a surface bearing polymeric beads.

The invention film is one that has a useful combination of optical and slip properties. Desired optical properties include low haze and good light transmittance making it suitable for use in optical devices. The substrate may be any transparent polymer such as polyesters and polyolefins. The preferred substrate layer is triacetyl cellulose (TAC), a polymeric material in which all or a predominant portion of the film is cellulose triacetate. Any known sources or additives may be used in the film. The average acetyl value of the TAC polymer preferably is in the range of 50 to 70%, especially in the range of 55 to 65%. The weight average molecular weight preferably is in the range of 150,000 to 250,000, especially 180,000 to 220,000. The polydispersity index (weight average divided by number average molecular weight) of cellulose acetate is typically in the range of 2 to 7, especially 2.5 to 4. Cellulose acetate may be esterified using a fatty acid such as propionic acid or butyric acid, so long as the acetyl value satisfies the range. Otherwise, cellulose acetate may contain other cellulose esters such as cellulose propionate or cellulose butyrate so long as the acetyl value satisfies the range. The substrate film may contain a plasticizer or other additives.

Suitable polymeric beads used in the invention comprise, for example, acrylic resins, styrenic resins, or cellulose derivatives, such as cellulose acetate, cellulose acetate butyrate, cellulose propionate, cellulose acetate propionate, and ethyl cellulose; polyvinyl resins such as polyvinyl chloride, copolymers of vinyl chloride and vinyl acetate and polyvinyl butyral, polyvinyl acetal, ethylene-vinyl acetate copolymers, ethylene-vinyl alcohol copolymers, and ethylene-allyl copolymers such as ethylene-allyl alcohol copolymers, ethylene-allyl acetone copolymers, ethylene-allyl benzene copolymers, ethylene-allyl ether copolymers, ethylene acrylic copolymers and polyoxy-methylene; polycondensation polymers, such as polyesters, including polyethylene terephthalate, polybutylene terephthalate, polyurethanes and polycarbonates.

In a preferred embodiment of the invention, the polymeric beads are made from a styrenic or an acrylic monomer. Any suitable ethylenically unsaturated monomer or mixture of monomers may be used in making such styrenic or acrylic polymer. There may be used, for example, styrenic compounds, such as styrene, vinyl toluene, p-chlorostyrene, vinylbenzyl chloride or vinyl naphthalene; or acrylic compounds, such as methyl acrylate, ethyl acrylate, n-butyl acrylate, n-octyl acrylate, 2-chloroethyl acrylate, phenyl acrylate, methyl-α-chloroacrylate, methyl methacrylate, ethyl methacrylate, butyl methacrylate; and mixtures thereof. In another preferred embodiment, methyl methacrylate is used.

In addition, a suitable crosslinking monomer is used in forming the polymeric beads in order to produce the desired properties. Typical crosslinking monomers are aromatic divinyl compounds such as divinylbenzene, divinylnaphthalene or derivatives thereof; diethylene carboxylate esters and amides such as ethylene glycol dimethacrylate, diethylene glycol diacrylate, and other divinyl compounds such as divinyl sulfide or divinyl sulfone compounds. Divinylbenzene and ethylene glycol dimethacrylate are conveniently employed. The crosslinking monomer desirably represents at least 20 weight %, suitably at least 35%, and typically at least 50 weight % of the monomer mix. The degree of crosslinking is determined by the weight % of multifunctional crosslinking monomer incorporated into the polymeric beads.

The polymeric beads used in this invention can be prepared, for example, by pulverizing and classification of organic compounds, by emulsion, suspension, and dispersion polymerization of organic monomers, by spray drying of a solution containing organic compounds, or by a polymer suspension technique which consists of dissolving an organic material in a water immiscible solvent, dispersing the solution as fine liquid droplets in aqueous solution, and removing the solvent by evaporation or other suitable techniques. The bulk, emulsion, dispersion, and suspension polymerization procedures are well known to those skilled in the polymer art and are taught in such textbooks as G. Odian in "Principles of Polymerization", 2nd Ed. Wiley (1981), and W. P. Sorenson and T. W. Campbell in "Preparation Method of Polymer Chemistry", 2nd Ed, Wiley (1968).

The surface of the polymeric beads may be covered with a layer of colloidal inorganic particles as described in U.S. Pat. Nos. 5,288,598; 5,378,577; 5,563,226 and 5,750,378. The surface may also be covered with a layer of colloidal polymer latex particles as described in U.S. Pat. No. 5,279,934.

The polymeric beads used in this invention will usually have a median diameter of less than about 5.0 μm, typically from 0.15 to 1.7 μm, and generally in the range of 0.5 to 1.7 μm. For further details concerning median diameter measurement, see T. Allen, "Particle Size Measurement", 4th Ed., Chapman and Hall, (1990).

The polymeric beads contained on the surface of the substrate will be such that the swell ratio is less than 1.31. If the bead swells 31% or more in methylene chloride, then the resulting film does not exhibit the combination of surface slip and good optical properties that is required for defect free optical device applications.

The bead laydown is preferably from 0.01 to 9.0 mg/m$^2$. When the median dry diameter of the beads is at least 0.5 microns, the typical laydown range is 0.01 to 2.5 mg/m$^2$, or conveniently, 0.1 to 1.5 mg/m$^2$. When the median dry diameter of the beads is less than 0.5 micrometers, the typical laydown range is 1 to 9 mg/m$^2$, or conveniently, 2 to 6 mg/m$^2$.

The invention also provides a method of forming a film having good surface slip/anti-blocking properties. The beads can be dispersed in a polymer solution designed to provide for good coating properties, but does not interfere with the functional performance of the film. The preferred binder of the second layer is a cellulosic polymer.

In the preferred embodiment, the polymeric substrate layer is TAC, the matrix of the polymeric layer containing the beads is also TAC, and the film desirably exhibits a static surface friction of less than or equal to 0.68 when tested against either itself or bare uncoated TAC film. In addition, the internal haze of the film must be less than 0.1. It is also desired that the total haze be within a desirable range not more than 0.90.

As shown in the examples, a method of applying the polymeric bead containing layer onto the substrate layer consisting of TAC film comprises applying the beads suspended in a dissolved binder in an appropriate solvent and applying the coating by various coating methods. The second polymer layer coating can either be applied to a fully cured TAC film or 'in-line' during the curing process of a solvent cast TAC film. Methanol is conveniently included in the coating solution.

TAC films have found a large market in polarizing plate manufacturing. In this process, dyed and oriented polyvinyl alcohol (PVA) sheets are glued between protective layers of TAC sheet. The acetate cover layers (one or both sides) protect the active PVA layer from physical damage and environmental agents that could cause chemical degradation to the PVA, with resulting polarization efficiency loss. Many different polymers have been proposed as protective cover layers for the optically active PVA sheet. To date, polymer extrusion has not been able to produce coversheets with the desired low birefringence properties. In general, all current polarizer coversheets are made from solvent cast TAC. Current industry specifications require LCD polarizer coversheets to posses a birefringence of less than 5 nanometers. The advantage of solvent casting is the extremely low stresses exerted on the polymer film as solvent leaves the forming web. Solvent sheet casting contains 20 to 40 percent polymer solids in a suitable solvent. The polymer chains are mobile in the solvent system and the stresses of hopper coating are easily relaxed, on the casting surface prior to solvent removal. Low stresses result in low orientation and the accompanying optical anisotropy.

TAC polymers have a cellulose chain backbone with varying degrees of acetylation. TAC can range in substitution from approximately 2.4 to 3 acetyl substitution points on the cellulose backbone. Other substitutions on the cellulose backbone could be hydroxyl, propyl or butyl groups. LCD coversheet is made with TAC substitution in the 2.8 to 2.9 range. This degree of acetyl substitution results in optimum polymer properties (such as clarity, physical strength, and polymer solubility.) TAC tends to be high in polymer molecular weight. This is due to the extremely large cellulose chains it is formed from. In the conversion process long cellulose chains are broken down in molecular weight and acetylated. Cellulose chains are helical in nature. The acetyl groups added in conversion to cellulose triacetate add bulky side groups to the polymer chain. This results in a polymer system that has long helical chains with bulky side groups. TAC cannot be thermally extruded, as it does not posses a melting point (it will oxidize first). Hydrogen bonding also plays a role in cellulose sheet formation. Long helical polymer chains, with bulky side groups, combined with rapid hydrogen bonding, results in a polymer system with very low order. TAC is thus a very good polymer for forming amorphous polymer sheet. The fundamental lack of TAC polymer orientation combined with the low stresses of solvent casting, forms a unique polymer system for extremely isotropic LCD coversheets. These fundamental advantages have allowed solvent cast cellulose triacetate to capture the vast majority of LCD coversheet applications. Low birefringence of protective layers is critical for clarity in liquid crystal displays. Orientation in the coversheet counteracts the specific orientation in the polyvinyl alcohol active layer, damaging the polarization efficiency of the complete package. LCD screens contain two polarizers with four coversheets. Improper orientation in the coversheets will also reduce the focus and clarity of the resulting display. The overriding need for low retardation coversheets has driven the industry to a universal acceptance of TAC sheet.

A polarizer element of the invention comprises a polarizer having a laminate of the film of the invention. A liquid crystal imaging element comprising such a polarizer. An optical device of the invention contains such a liquid crystal element.

The invention may be used in conjunction with any liquid crystal display devices, typical arrangements of which are described in the following. Liquid crystals (LC) are widely used for electronic displays. In these display systems, an LC layer is typically situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passes through a liquid crystal cell and is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of applications, including but not limited to digital watches, calculators, portable computers, electronic games for which light weight, low power consumption and long operating life are important features.

Active-matrix liquid crystal displays (LCDs) use thin film transistors (TFTs) as a switching device for driving each liquid crystal pixel. These LCDs can display higher-definition images without cross talk because the individual liquid crystal pixels can be selectively driven. Optical mode interference (OMI) displays are liquid crystal displays, which are "normally white," that is, light is transmitted through the display layers in the off state. "Film-compensated super-twisted nematic" (FSTN) LCDs are normally black, that is, light transmission is inhibited in the off state when no voltage is applied. OMI displays reportedly have faster response times and a broader operational temperature range.

Ordinary light from an incandescent bulb or from the sun is randomly polarized, that is, it includes waves that are oriented in all possible directions. A polarizer is a dichroic material that functions to convert a randomly polarized ("unpolarized") beam of light into a polarized one by selective removal of one of the two perpendicular plane-polarized components from the incident light beam. Linear polarizers are a key component of liquid-crystal display (LCD) devices.

There are several types of high dichroic ratio polarizers possessing sufficient optical performance for use in LCD devices. These polarizers are made of thin sheets of materials that transmit one polarization component and absorb the other mutually orthogonal component (this effect is known as dichroism). The most commonly used plastic sheet polarizers are composed of a thin, uniaxially-stretched polyvinyl alcohol (PVA) film which aligns the PVA polymer chains in a more-or-less parallel fashion. The aligned PVA is then doped with iodine molecules or a combination of colored dichroic dyes (see, for example, EP 0 182 632 A2, Sumitomo Chemical Company, Limited) which adsorb to and become uniaxially oriented by the PVA to produce a highly anisotropic matrix with a neutral gray coloration. To mechanically support the fragile PVA film, it is then laminated on both sides with stiff layers of triacetyl cellulose (TAC), or similar support.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

Another technique for improving wound roll quality that can be employed, which is particularly advantageous when used with wound rolls greater than 45 inches in diameter, is variably knurling the edges of the web as described in U.S. Pat. No. 5,393,589. The height or compressibility of the edge knurls is varied along the length of the web in a predetermined manner. This invention also provides a process for forming a wound roll of a film of the main embodiment comprising passing the film through a processing cycle employing a variable knurl height.

EXAMPLES

Several beads were evaluated for properties such as Swell Diameter Ratio and refractive index. For refractive index measurements the polymer beads were suspended in a standard series of Carguille oils that span the refractive index range of 1.40 to1.70 in 0.004 steps. The bracketed index was inferred when the bead contrast faded with optical microscopy. The refractive index for the beads ranged from 1.42 to 1.6. The diameter of the beads was determined by either Dynamic Light Scattering (DLS) or Low Angle Laser Light Scattering (LALLS). DLS was used to measure the hydrodynamic volume of the polymer beads in a very dilute suspension. This method is accurate for bead diameters on the order of 1.0 micrometers or less and is preferred for bead compositions susceptible to aggregation in methylene chloride solvent. LALLS, using a Horiba LA-920® instrument can be used to measure the effective diameter of the beads on the order of 0.1 micrometers or greater. The bead types and the results of the above-described tests are shown in Table 1.

TABLE 1

Bead Sample Identification and Properties

| Sample ID | Bead composition* monomer %/crosslinker % | Bead swell ratio $MeCl_2$/water | Bead Diameter $\mu$ |
|---|---|---|---|
| A | MMA (50)/EGDM (50) | 1 | 0.6 |
| B | MMA (50)/EGDM (50) | 1 | 1.38 |
| C | MMA (50)/EGDM (50) | 1 | 1.65 |
| D | MMA (50)/EGDM (50) | 1 | 1.58 |
| E | none/EGDM (100) | 1 | 0.18 |
| F | none/EGDM (100) | 1 | 0.57 |
| G | none/EGDM (100) | 1 | 0.71 |
| H | none/EGDM (100) | 1 | 0.74 |
| I | MMA (80)/EGDM (20) | 1.28 | 1.5 |
| J | none/DVB-HP[1] (100) | 1.31 | 1.6 |
| K | PMSQ | 1.43 | 0.5 |
| L | MMA (98)/DVB-55[2] (2) | 1.45 | 0.2 |
| M | MMA (98)/DVB-55[2] (2) | 1.45 | 0.6 |

*MMA = methyl methacrylate
EGDM = ethylene glycol dimethacrylate
DVB-HP[1] = 80% pure divinyl benzene from Dow Chemical
PMSQ = polymethylsilsesquioxane made as described in Example 3 of U.S. Pat. No. 5,9369031.
DVB-55[2] = 55% pure divinyl benzene from Dow Chemical Sample films with the bead types listed in Table 1 were prepared to compare slip properties (more specifically the static friction) and optical properties (total haze and internal haze). Coating solutions were prepared by mixing cellulose triacetate (or cellulose diacetate for samples 16 and 18) in acetone with a bead dispersion (~25 wt % solids) in either water or MeOH. Once dispersed the solutions were coated onto fully cured and dried TAC film. The dry coating laydown for the components was 20 to 50 $mg/m^2$ of the cellulose triacetate and 0.09 up to 8.4 $mg/m^2$ of the polymeric bead (dry weight). The coatings can be made by any typical coating method such as roll or slot coating.

Total and Internal haze were measured with a Gardner Haze Meter, model: Haze-Gard Plus. When the Haze meter is operated in haze mode the percentage of transmitted light that is scattered due to a combination of surface irregularities and particles in the film base is measured. This is referred to as Total Haze. Five centimeter by five centimeter samples are cut from different areas of the coated sheet, measured and the results are recorded as an average of at least three samples. Internal haze measures the clarity of film sheet without the contribution of light scattering that results from the surface. Samples are cut from the sheet and suspended in Decalin solution for haze measurement. The difference in haze between the sample measured in this way referenced to a Decalin control is the internal haze of the sample. The recorded value for both Total and Internal haze is the average of at least three samples.

Film surface friction was measured according to ASTM designation G143-96 wherein one film sample is mounted on a stationary test roller and another film sample is slid against the surface under tension. The tension and force to slide is measured and from these measurements the coefficient of friction can be calculated. In the case where a coating is tested against a bare TAC film surface the results are referred to as "one sided" static friction, when the coating is tested against itself the results are referred to as "two sided" static friction.

The data for coated film properties are summarized in Table 2A and 2B.

TABLE 2A

Results for Beads ≧ 0.5 micrometers

| Coating ID | | Bead Sample ID | bead laydown mg/m² | Internal Haze (aim not more than 0.1) | One sided static friction @ 10 pli (aim not more than 0.68) | Two sided static friction @ 10 pli |
|---|---|---|---|---|---|---|
| 1 | comparison | B | 0.09 | | 0.7 | 0.53 |
| 2 | comparison | C | 0.09 | | 0.69 | 0.6 |
| 3 | invention | A | 0.23 | 0.04 | 0.48 | 0.48 |
| 4 | invention | H | 0.23 | 0.04 | 0.57 | 0.53 |
| 5 | invention | F | 0.46 | 0.06 | 0.59 | 0.48 |
| 6 | invention | A | 0.46 | 0.01 | 0.5 | 0.48 |
| 7 | invention | H | 0.46 | 0.02 | 0.53 | 0.45 |
| 8 | invention | I | 0.46 | 0.06 | 0.67 | 0.64 |
| 9 | invention | C | 0.7 | 0.01 | 0.53 | 0.47 |
| 10 | invention | A | 0.93 | 0.05 | 0.49 | 0.48 |
| 11 | invention | I | 0.93 | 0.03 | 0.59 | 0.54 |
| 12 | invention | I | 1.39 | 0.06 | 0.52 | 0.49 |
| 13 | comparison | F | 2.79 | 0.2 | — | — |
| 14 | comparison | A | 2.79 | 0.13 | — | — |
| 15 | comparison | J | 0.46 | 0.37 | 0.47 | 0.43 |
| 16* | comparison | J | 0.93 | 0.13 | 0.46 | 0.46 |
| 17 | comparison | K | 0.93 | 0.11 | 0.62 | 0.5 |
| 18* | comparison | K | 2.79 | 0.12 | 0.49 | 0.54 |
| 19 | comparison | M | 0.93 | 0.12 | sample broke | 0.59 |

*coating out of cellulose diacetate instead of cellulose triacetate

TABLE 2B

Results for Beads < 0.5 micrometers

| Coating ID | | Bead Sample ID | bead laydown mg/m² | Internal Haze (aim not more than 0.1) | Two sided static friction @ 10 pli (aim not more than 0.68) |
|---|---|---|---|---|---|
| 20 | comparison | E | 0.93 | 0.05 | sample broke |
| 21 | invention | E | 4.65 | 0.05 | 0.44 |
| 22 | Invention | E | 8.36 | 0.04 | 0.47 |
| 23 | comparison | L | 0.93 | 0.03 | sample broke |
| 24 | comparison | L | 4.65 | 0.02 | sample broke |
| 25 | comparison | L | 8.36 | 0.07 | sample broke |

Although all the beads tested were crosslinked, the results show that when the measured swell ratio is 31% or greater the beads do not provide a surface which is good in both static friction performance and in optical quality. When the bead level coated is too low the static friction force is observed to be too high. When the bead level gets too high, too much light scattering or internal haze is observed. The performance window between these two limits depends on the bead size and the bead swell. Two sided static friction is typically? lower than one sided static friction for invention.

A second set of samples were generated by coating cellulose triacetate solution/bead dispersions 'in-line' during the curing of solvent cast triacetyl cellulose (TAC) film. The film was coated on both sides and then wound into rolls. The rolls were held at 27° C. and 75% relative humidity and then evaluated for roll quality. The comparison is between a typical roll of untreated TAC film and films which have been coated with specific examples from the invention. The results are shown in Table 3.

TABLE 3

Crossover from Coating Performance Results to Observed Wound Roll Quality

| bead type | bead laydown mg/m² | Internal Haze | Two sided static friction @ 10 pli | Roll Length (feet) | Wound roll Quality (@ 45 minutes) |
|---|---|---|---|---|---|
| no beads | | 0.05 | >1.0 web broke | 3000 | hard streaks, dimples and distortions |
| D | 0.56 | 0.04 | 0.63 | 3000 | no streaks, dimples or distortions |
| G | 0.7 | 0.04 | 0.48 | 8600 | no streaks, dimples or distortions |
| D | 1.39 | 0.05 | 0.48 | 8600 | no streaks, dimples or distortions |

The results show that the observed wound roll quality as characterized by the presence or absence of hard streaks, dimples, or other distortions is significantly improved when an appropriate bead is coated at an appropriate laydown as defined by the invention. The friction and anti blocking properties of the film were improved while the optical properties were not deteriorated. When the bead type, size and coating laydown were chosen such that the static friction measured in Table 2A or 2B is less than 0.68, the corresponding wound roll quality was good and the sheets did not block together when the roll was unwrapped.

When coatings of this type are used in the manufacture of polarizers for LCD applications, they are processed by saponification. In order for the coating on the substrate to remain intact and continue to provide good friction performance, it is necessary that the layer not be degraded during saponification. Table 4 shows the degradation (characterized by % weight loss of polymer) for the two polymeric binder types used in these examples. To determine degradation, the polymeric binders were tested in both powder form and cast films. For the powder, 2.5 g of the polymer was added to 10 mL of 2N NaOH @ 60° C. and stirred for 90 seconds. The samples were then filtered through a 0.2 micrometer nalgene filter, dried in a 60° C. vacuum oven for 72 hours and re-weighed. For the film samples the polymers were solvent cast and dried for a minimum of 48 hours in a vacuum oven. The films were tared and placed in 2N NaOH @ 60° C. for 90 seconds, rinsed and dried in a 50° C. vacuum oven for 16 hours and reweighed.

TABLE 4

Percent Weight Loss of polymer in Saponification

| Polymer type | Degree of Acetylation | Loss of powder sample | Loss of film sample |
| --- | --- | --- | --- |
| Cellulose Diacetate | 2.4 | 29.5% | 4.77% |
| Cellulose Triacetate | 2.86 | 4.3% | 0.27% |

As shown in Table 4, the cellulose triacetate shows much less degradation when exposed to saponification conditions than the cellulose diacetate.

The entire contents of the patents and other publications referred to in this specification are incorporated herein by reference.

What is claimed is:

1. An integral film comprising a transparent polymeric substrate having a surface bearing polymeric beads, wherein the swell ratio, the size, and the laydown of the beads are selected so as to provide both a one sided static friction coefficient of not more than 0.68 and an internal haze value of not more than 0.1.

2. The film of claim 1 wherein the polymeric beads are present on the substrate surface as a dispersion in a polymeric matrix.

3. The film of claim 2 wherein the matrix is a cellulose ester.

4. The film of claim 3 wherein the matrix is a cellulose triacetate.

5. The film of claim 1 wherein the substrate is an isotropic polymer.

6. The film of claim 5 wherein the substrate is a cellulose ester.

7. The film of claim 6 wherein the substrate is a cellulose triacetate.

8. The film of claim 1 wherein the bead makeup is selected so that the refractive index difference between the substrate material and the bead material is not more than 0.1.

9. The film of claim 1 wherein the bead makeup is selected so that the refractive index difference between the substrate material and the bead material is not more than 0.05.

10. The film of claim 1 wherein the beads comprise crosslinked polymers.

11. The film of claim 10 wherein the beads exhibit a degree of crosslinking of at least 25%.

12. The film of claim 1 wherein the beads exhibit a volume average diameter of at least 0.5 micrometers and the bead laydown is in the range of 0.01 to 2.5 mg/m$^2$.

13. The film of claim 12 wherein the laydown is in the range of 0.1 to 1.5 mg/m$^2$.

14. The film of claim 12 wherein the swell ratio is less than 1.31.

15. The film of claim 1 wherein the beads exhibit a volume average diameter less than 0.5 micrometers and the bead laydown is in the range of 1 to 9 mg/m$^2$.

16. The film of claim 15 wherein the bead laydown is in the range of 2 to 6 mg/m$^2$.

17. The film of claim 15 wherein the swell ratio is less than 1.31.

18. The film of claim 1 wherein two surfaces of the substrate bear the polymeric beads.

19. The film of claim 1 wherein the swell ratio is less than 1.31.

20. The film of claim 1 wherein the bead diameter is 0.5 to 1.7 micrometers.

21. The film of claim 1 where the bead laydown is 0.1 to 2.5 mg/m$^2$.

22. The film of claim 1 wherein the two-sided static friction coefficient is not more than 0.68.

23. The film of claim 1 wherein the beads are made from a styrenic or acrylic monomer.

24. The film of claim 1 wherein the beads are made from an acrylic monomer.

25. A process for preparing a film of claim 2 comprising solvent coating a solution or dispersion of the matrix and the beads onto the substrate and removing the solvent.

26. A process for preparing a wound roll of the film of claim 2 comprising variably knurling the edges of the film.

27. The process of claim 26 wherein the height or compressibility of the edge knurls is varied along the length of the wound roll.

28. The process of claim 27 wherein the height of the edge knurls is varied along the length of the wound roll.

* * * * *